(12) United States Patent
Watanabe et al.

(10) Patent No.: US 10,302,840 B2
(45) Date of Patent: May 28, 2019

(54) BACKLIGHT

(71) Applicants: CITIZEN WATCH CO., LTD., Nishitokyo-shi (JP); CITIZEN ELECTRONICS CO., LTD., Fujiyoshida-shi, Yamanashi (JP)

(72) Inventors: Kiyokazu Watanabe, Fujikawaguchiko-machi (JP); Naoya Kashiwagi, Fujiyoshida (JP); Takuma Horiuchi, Otsuki (JP); Takashi Watanabe, Fujiyoshida (JP)

(73) Assignees: CITIZEN WATCH CO., LTD, Tokyo (JP); CITIZEN ELECTRONICS CO., LTD., Yamanashi (JP)

( * ) Notice: Subject to any disclaimer, the term of this patent is extended or adjusted under 35 U.S.C. 154(b) by 67 days.

(21) Appl. No.: 15/466,055

(22) Filed: Mar. 22, 2017

(65) Prior Publication Data
US 2017/0276861 A1 Sep. 28, 2017

(30) Foreign Application Priority Data

Mar. 23, 2016 (JP) .................. 2016-058064
May 11, 2016 (JP) .................. 2016-095057

(51) Int. Cl.
*F21V 8/00* (2006.01)
*G02F 1/1335* (2006.01)

(52) U.S. Cl.
CPC ......... *G02B 6/0033* (2013.01); *G02B 6/0043* (2013.01); *G02F 1/133553* (2013.01)

(58) Field of Classification Search
CPC .. G02B 6/0033; G02B 6/0043; G02B 6/0031; G02F 1/133524; G02F 1/133553; G02F 1/133555; G02F 1/133615
See application file for complete search history.

(56) References Cited

U.S. PATENT DOCUMENTS 9,625,643 B2 * 4/2017 Liu ................. G02B 6/0088
2018/0321555 A1 * 11/2018 Hata ....................... F21S 2/00

FOREIGN PATENT DOCUMENTS

JP            06289231 A       10/1994

* cited by examiner

*Primary Examiner* — Anabel Ton
(74) *Attorney, Agent, or Firm* — RatnerPrestia

(57) ABSTRACT

There is provided a backlight capable of easily eliminating a bright portion generated near lateral surfaces of a light guide plate, even when a plate-like reflective member is brought close to the lateral, surfaces of the light guide plate. The backlight includes, a light guide plate including a light emission surface, a reflective surface, and at least one of the lateral surface as an incident surface, a light source disposed to face the incident surface, a reflective member which is disposed to face another lateral surface other than the incident surface and includes a diffusion reflective surface, and an adhesive member for adhering the reflective member to the another lateral surface of the light guide plate, wherein a length of the adhesive member in a thickness direction of the light guide plate is smaller than a thickness of the light guide plate.

20 Claims, 6 Drawing Sheets

BACKLIGHT

CROSS-REFERENCES TO RELATED APPLICATION

This application is a new U.S. patent application that claims benefit of JP 2016-058064, filed on Mar. 23, 2016, and JP 2016-095057, filed on May 11, 2016. The entire content of JP 2016-058064 and JP 2016-095057 are hereby incorporated by reference.

TECHNICAL FIELD

The present invention relates to a backlight including a light guide plate for making lights incident from lateral surfaces and making lights emit from a front surface.

BACKGROUND

A backlight including a plate-like light guide plate is disposed on a back surface of a liquid crystal panel of a liquid crystal display device in some cases. In the light guide plate, one main surface having a large area is a light emission surface, the other main surface facing the light emission surface is a reflective surface, and at least one lateral surface orthogonal to the main surface of the light guide plate is an incident surface. A light source such as an LED is disposed to face the incident surface. Light emitted from the light source enters the light guide plate from the incident surface and propagates through the light guide plate while repeating reflection. When a part of the light strikes dots or the like formed on the reflective surface, a propagation direction of the part of the light is changed, and the light is partially emitted from the light emission surface. The remaining light propagates toward the lateral surfaces of the light guide plate. Therefore, to improve a luminous efficiency on the light emission surface, it is known that a reflective member is disposed to face the lateral surface of the light guide plate, so that the light supposed to be emitted from the lateral surfaces is returned to the light guide plate.

However, when the reflective member is disposed to face the lateral surface of the light guide plate, the light propagating toward the lateral surface and the light reflected and returned by the lateral surface, are concentrated near the lateral surface, and thus the following phenomenon occurs: the luminance near the lateral surface of the light emission surface is more increased than the other regions.

In order to overcome such non-uniformity of luminance, Japanese Unexamined Patent Publication (Kokai) No. H6-289231 discloses that a gap is formed between the lateral surface of the light guide plate and the reflective member, that a bottom surface near the lateral surface is formed as a mirror surface, and that the reflective member is formed as a concave mirror.

SUMMARY

However, when a distance between the reflective member and the lateral surface of the light guide plate is varied, emission quantities are also varied. Therefore, there is a case that the reflective member and the light guide plate are brought into close contact with each other and fixed by a double-sided tape or the like. Therefore, it is better not to provide a gap between the lateral surface of the light guide plate and the reflective member. Further, the reflective member must have a plate-like shape, and therefore it is usually difficult to form the reflective member as a concave mirror.

When the reflective surface of the light guide plate near the lateral surface is formed as a mirror surface, brightness becomes uniform in some cases when observed from one direction. However, it is difficult to make directivity coincident between the other region having reflection dots, etc., and a mirror-finished region. Therefore, there is no guarantee that the luminance will be uniform even when it is observed from any direction. The shape, arrangement, density, etc., of the dots, etc., on the reflective surface, are set to eliminate factors that greatly contribute to the non-uniformity of luminance such as a discrete arrangement of the light sources. However, the non-uniformity of the luminance that appears near the lateral surface is a matter to be finely adjusted, because it changes depending on the characteristics of the employed reflective member. Therefore, it is not realistic to change a design of the reflective surface of the light guide plate every time the reflective member is changed.

An object of the present invention is to provide a backlight capable of easily eliminating a bright portion generated near a lateral surface of a light guide plate, even when a plate-like reflective member is brought close to the lateral surface of the light guide plate.

There is provided a backlight, including a light guide plate including a light emission surface, a reflective surface, and at least one lateral surface as an incident surface, a light source disposed to face the incident surface, a reflective member disposed to face the other lateral surface other than the incident surface and having a diffusion reflective surface, and an adhesive member for adhering the reflective member to the other lateral surface of the light guide plate, wherein a length of the adhesive member in a thickness direction of the light guide plate is smaller than a thickness of the light guide plate.

Further preferably, in the backlight, the length of the adhesive member in the thickness direction of the light guide plate is constant.

Further preferably, in the backlight, the length of the adhesive member in the thickness direction of the light guide plate is not constant.

Further preferably, in the backlight, the adhesive member has a slit.

Further preferably, in the backlight, a length of the reflective member in the thickness direction of the light guide plate is smaller than a thickness of the light guide plate.

Further preferably, in the backlight, a length of the reflective member in the thickness direction of the light guide plate is constant.

Further preferably, in the backlight, the length of the reflective member in the thickness direction of the light guide plate is not constant.

Further preferably, in the backlight, the other lateral surface of the light guide plate has exposed units on the light emission surface side and the reflective surface side.

Further preferably, in the backlight, the reflective member further includes a portion integrally formed with a portion disposed to face the other lateral surface of the light guide plate and disposed to face the reflective surface of the light guide plate.

Further preferably, in the backlight, at least one of the lateral surfaces is a specular reflective surface.

As described above, in the backlight of the present application, specular reflection occurs on the lateral surface other than the incident surface of the light guide plate, and diffusive reflection is weakened. As a result, the emission quantities on the light emission surface near the lateral surface is adjusted, and therefore even when the plate-like reflective member is brought close to the lateral surface of the light guide plate, a bright portion generated near the lateral surface of the light guide plate can be easily eliminated.

BRIEF DESCRIPTION OF THE DRAWING

Other features and advantages of the present backlight will be apparent from the ensuing description, taken in conjunction with the accompanying drawings, in which.

DESCRIPTION

Figure 1:
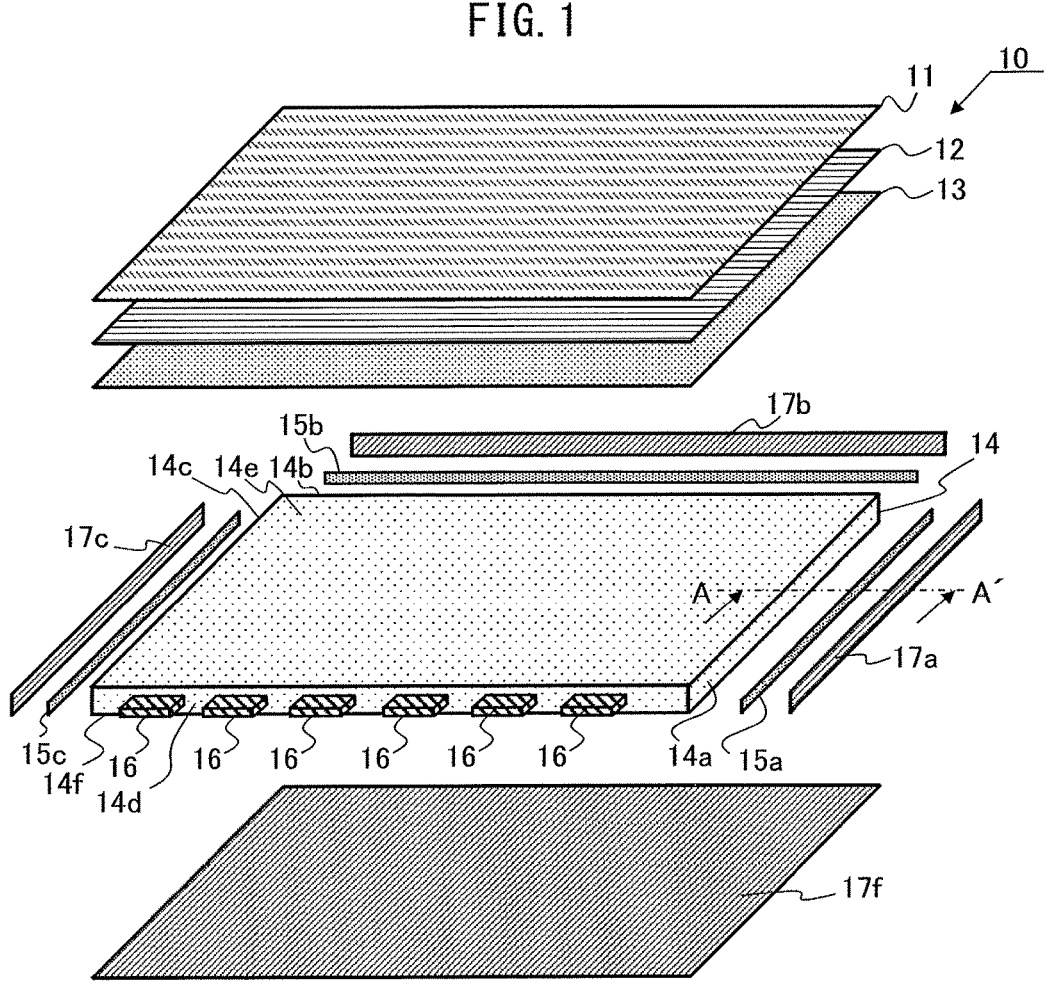
FIG. 1 is an exploded perspective view of a backlight 10.

Preferable embodiments of the present invention will be described in detail hereafter, with reference to the attached drawings 1 to 13. However, it should be noted that a technical scope of the present invention is not limited to these embodiments, but extends to the invention described in the claims and equivalents thereof. In the description of the drawings, the same or equivalent elements are denoted by the same reference numerals, and duplicate explanation is omitted. The scale sizes of the drawing are appropriately changed for the purpose of explanation.

(First Embodiment)

Figure 2:
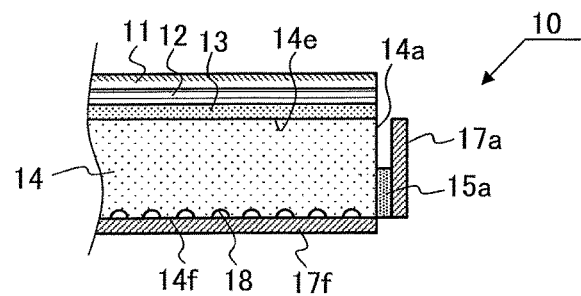
FIG. 2 is a partial cross-sectional view of the backlight 10 taken along the line A-A' illustrated in FIG. 1.
Figure 3:
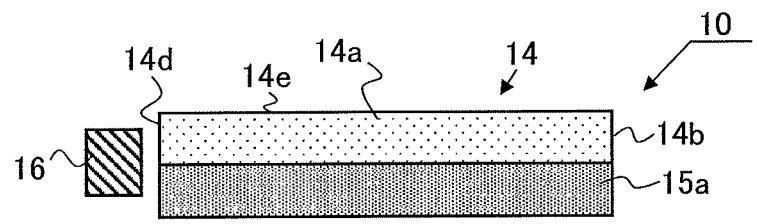
FIG. 3 is a side view of the backlight 10.
Figure 4:
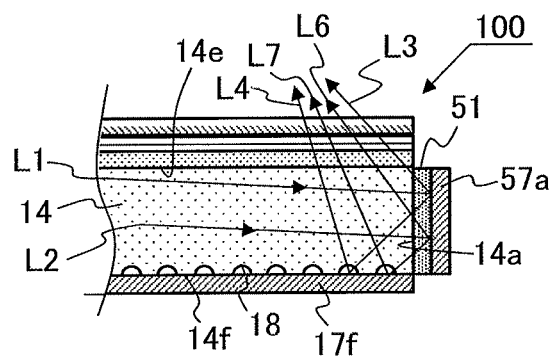
FIG. 4 is a partial cross-sectional view of the backlight 100 according to a comparative example.
Figure 5:
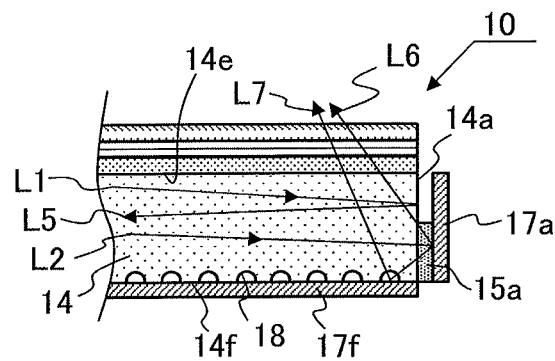
FIG. 5 is a partial cross-sectional view of the backlight 10.

A backlight 10 illustrated as a first embodiment of the present invention will be described with reference to FIGS. 1 to 5. FIG. 1 is an exploded perspective view of a backlight 10. FIG. 2 is a partial cross-sectional view of the backlight 10 taken along the line A-A' illustrated in FIG. 1. FIG. 3 is a side view of the backlight 10 drawn for explaining a relationship between a lateral surface 14a and a double-sided tape 15a of a light guide plate 14. FIG. 4 is a partial cross-sectional view of a comparative example (backlight 100) drawn for explaining a mechanism in which a bright portion is generated near the lateral surface. FIG. 5 is a partial cross-sectional view of the backlight 10 drawn for explaining a mechanism in which a bright portion near the lateral surface is eliminated.

As illustrated in FIG. 1, the backlight 10 has a reflective surface reflection sheet 17f disposed on a lower surface side of the light guide plate 14, and a diffusion sheet 13, a prism sheet 12, and a polarization sheet 11 laminated on an upper surface side of the light guide plate 14. The light guide plate 14 has an upper main surface, a lower main surface, and four lateral surfaces. The upper main surface is a light emission surface 14e, and the lower main surface is a reflective surface 14f. One lateral surface of the four lateral surfaces is an incident surface 14d, and the rest are lateral surfaces 14a, 14b, and 14c (lateral surfaces other than the incident surface). The lateral surfaces 14a, 14b, 14c specularly reflect lights that travel through the light guide plate 14 and reach the lateral surfaces 14a, 14b, 14c. Six LEDs 16 (light sources) are disposed to face the incident surface 14d. Double-sided tapes 15a, 15b, 15c (adhesive members) are attached to the lateral surfaces 14a, 14b, 14c, respectively. Lateral surface reflection sheets 17a, 17b, 17c are attached to the double-sided tapes 15a, 15b, 15c. The surfaces of the lateral surface reflection sheets 17a, 17b, 17c, which are faced to the lateral surfaces 14a, 14b, 14c, are diffusion reflective surfaces. A case for housing each member is not illustrated.

With reference to FIG. 2, the members illustrated in FIG. 1 will be described in further detail. Dots 18 for changing a traveling direction of the light that propagates through the light guide plate 14 while repeatedly reflecting in the light guide plate 14 to emit the light from the light emission surface 14e are formed on the reflective surface 14f of the light guide plate 14. The double-sided tape 15a is attached to a lower half region of the lateral surface 14a of the light guide plate 14. The lateral surface reflection sheet 17a is attached through the double-sided tape 15a. The diffusion sheet 13, the prism sheet 12, and the polarization sheet 11 are laminated on the light emission surface 14e of the light guide plate 14 through air layers (not illustrated), respectively.

The light guide plate 14 is made of polycarbonate, acrylic, or the like. A thickness of the light guide plate 14 is preferably 2.0 to 3.0 mm, and is 2.25 mm in an example of FIG. 1. The dots 18 are formed by laser processing. A diameter of a concave portion of the dot 18 is 50 to 500 μm, and its diameter varies depending on places such that the luminance on the light emission surface 14e becomes uniform. The reflective surface reflection sheet 17f and the lateral surface reflection sheets 17a, 17b, 17c are made of white PET. The reflective surface reflection sheet 17f and the lateral surface reflection sheets 17a, 17b, 17c have a thickness of, for example, about 200 μm. The double-sided tape 15a is made of a transparent PET sheet having adhesive layers on both sides. A thickness of the double-sided tape 15a is, for example, about 100 μm. The diffusion sheet 13 diffuses light by fine particles scattered and fixed on a transparent sheet. A thickness of the diffusion sheet 13 is preferably 120 to 140 μm, and is 130 μm in the example of FIG. 1. The prism sheet 12 adjusts a traveling direction of the light by a large number of fine prisms formed on an upper surface of the transparent sheet. A thickness of the prism sheet 12 is, for example, about 160 μm. The polarization sheet 11 transmits one polarized light while reflecting another polarized light orthogonal to the one polarized light. A thickness of the polarization sheet 11 is, for example, about 400 μm.

As illustrated in FIG. 3, a width of the double-sided tape 15a in a vertical direction (thickness direction of the light guide plate 14) in the drawing is constant (in the form of a band), for example 1.1 mm, and smaller than the thickness of the light guide plate 14 (2.25 mm as described above). So as not to lower a luminous efficiency, a length of the double-sided tape 15a in the thickness direction of the light guide plate 14 is preferably 50% or more and more preferably 75% or more of the thickness of the light guide plate 14. The double-sided tape 15a is attached to a lower side of the lateral surface 14a. A region to which the double-sided tape 15a is attached in a longitudinal direction of the lateral surface 14a may be adjusted by the distribution of the bright portions. The double-sided tape 15a may be attached in any of the upper, middle, and lower positions in a short direction of the lateral surface 14a. In FIG. 3, the purpose is to explain the relationship between the lateral surface 14a and the double-sided tape 15a, and therefore the reflective surface reflection sheet 17f, the lateral surface reflection sheets 17a and 17b, the diffusion sheet 13, the prism sheet 12, the polarization sheet 11, and the double-sided tape 15b are not illustrated. To facilitate understanding, the LED 16 disposed to face the incident surface 14d of the light guide plate 14, the light emission surface 14e which is the main surface of the light guide plate 14, and the lateral surface 14b disposed to face the incident surface 14d are illustrated. The thickness (in a horizontal direction in the drawing) of the LED 16 is, for example, 1.4 mm.

With reference to FIGS. 4 and 5, explanation will be given for a mechanism in which the bright portion is generated near the lateral surface 14a and a mechanism in which the bright portion is eliminated. In the backlight 100 (comparative example) illustrated in FIG. 4, the double-sided tape 15a attached to the lower half of the lateral surface 14a illustrated in FIG. 3 is replaced by a double-sided tape 51 attached to an entire lateral surface 14a. In other words, in the backlight 100, unlike the backlight 10, the lateral surface reflection sheet 17a is adhered to the entire lateral surface 14a of the light guide plate 14 through a double-sided tape 51.

As illustrated in FIG. 4, a light beam L1 passes through the lateral surface 14a and the double-sided tape 51, and is diffusely reflected by the diffusion reflective surface of the lateral surface reflection sheet 17a. Due to the diffusive reflection of the light beam L1, a light beam L3 directed obliquely upward to the left and a light beam L4 which is directed downward to the left, reflected by the reflective surface reflection sheet 17f, and directed obliquely upward to the left are generated. Likewise, due to the diffusive reflection of a light beam L2 by the lateral surface reflection sheet 17a, a light beam L6 directed obliquely upward to the left and a light beam L7 which is directed obliquely downward to the left once, reflected by the reflective surface reflection sheet 17f, and directed obliquely upward to the left are generated. In FIG. 4, only light beams that affect the bright portion generated near the lateral surface 14a are illustrated, and other light beams generated by diffusive reflection or light beams emitting from the region near the lateral surface before reaching the lateral surface 14a are not illustrated.

As described above, in the backlight 100, due to the diffusive reflection by the lateral surface reflection sheet 17a, light beams L3, L4, L6, L7 are concentrated near the lateral surface 14a, and the bright portion is generated.

As illustrated in FIG. 5, in the backlight 10, similarly to the backlight 100, due to the diffusive reflection of the light beam L2 by the diffusion reflective surface of the lateral surface reflection sheet 17a, light beams L6 and L7 are generated. In contrast, due to a specular reflection of the light beam L1 on an interface between the lateral surface 14a and the air, a light beam L5 is generated. The light beam L5 is not emitted from the light emission surface 14e near the lateral surface 14a, resulting in generating the light beam L5 in the backlight 10. Therefore, a diffusely reflected light is reduced and the bright portion is not generated near the lateral surface 14a as compared with the backlight 100 illustrated in FIG. 4. This mechanism applies to other lateral surfaces 14b and 14c. Components that are not specularly reflected as the rest of the light beam L1 are diffusely reflected by the lateral surface reflection sheet 17a, but this is not illustrated.

As described above, on the lateral surfaces 14a, 14b, and 14c other than the incident surface 14d of the light guide plate 14 of the backlight 10, diffusive reflection and specular reflection are mixed, the specular reflection being the reflection on a region to which the double-sided tapes 15a, 15b, and 15c are not attached, to thereby adjust the emission quantities on the light emission surface 14e near the lateral surface. As a result, in the backlight 10, the bright portion generated near the lateral surfaces 14a, 14b, 14c of the light guide plate 14 can be eliminated even when the lateral surface reflection sheets 17a, 17b, 17c which are plate like reflective members are brought close to the lateral surfaces 14a, 14b, 14c of the light guide plate 14. The ratio between the diffusive reflection and the specular reflection is adjusted by the width of the double-sided tape 15a or the like.

(Second Embodiment)

Since the double-sided tape 15a of the backlight 10 of the first embodiment is in the form of a band, the ratio between the diffusive reflection and the specular reflection is the same at any position in a longitudinal direction of the lateral surface 14a of the backlight 10. However, depending on the position in the longitudinal direction of the lateral surface 14a, it is desired to change the ratio between the diffusive reflection and the specular reflection in some cases. Therefore, with reference to FIG. 6, explanation will be given for a backlight 20 as a second embodiment in which the proportion of the specular reflection is large in a region far from the LED 16 of the lateral surface 14a, and the proportion of the specular reflection is small in a region close to the LED 16.

Figure 6:
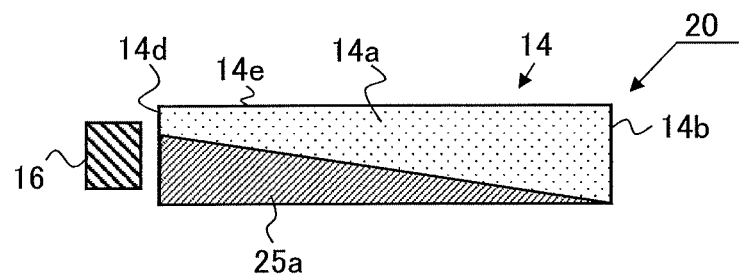
FIG. 6 is a side view of a backlight 20.

FIG. 6 is a side view of the backlight 20 drawn for explaining the relationship between the lateral surface 14a and the double-sided tape 25a of the light guide plate 14. FIG. 6 differs from the side view of the backlight 10 of FIG. 3 only in the shape of the double-sided tape 25a. Note that members which are omitted to be illustrated are the same as those of FIG. 3.

The width of the double-sided tape 25a on the lateral surface 14a is wide in a region close to LED 16, and narrows as it goes away from the LED 16. In other words, the double-sided tape 21 functions effectively if, without using the double-sided tape 25a, the bright portion is strongly generated in a region far from the lateral surface 14a and in a region close to the LED 16. On the contrary, when the bright portion is strongly generated in a region close to the LED 16, the width of the double-sided tape 25a may be widened on the lateral surface 14a as it goes away from the LED 16.

(Third Embodiment)

In the backlight 20 of the second embodiment, the width of the double-sided tape 25a is varied depending on places. Therefore, manufacture may become difficult due to processing or an attachment work applied to the double-sided tape 25a. Further, there is a case that the lateral surface reflection sheet 17a may not be firmly fixed to the light guide plate 14 at a narrow width portion of the double-sided tape 25a. Therefore, with reference to FIG. 7, explanation will be given for a backlight 30 capable of solving the abovementioned problem by setting the width of the double-sided tape to be constant, while varying the ratio between the diffusive reflection and the specular reflection along the longitudinal direction of the lateral surface 14a.

Figure 7:
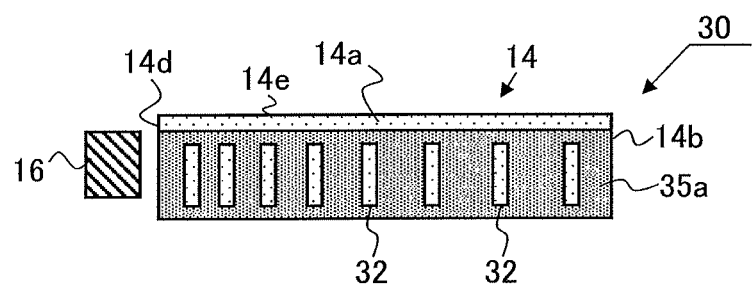
FIG. 7 is a side view of a backlight 30.

FIG. 7 is a side view of the backlight 30. With reference to FIG. 7, explanation will be given for the relationship between the lateral surface 14a of the light guide plate 14 and the double-sided tape 35a. FIG. 7 differs from the side view of the backlight 10 of FIG. 3 only in the shape of the double-sided tape 35a. Note that members which are omitted to be illustrated are the same as those of FIG. 3.

As illustrated in FIG. 7, slits 32 are opened in the double-sided tape 35a. Density of the slits 32 of the double-sided tape 31 is large in a region close to the LED 16 and small as it goes away from the LED 16. In other words, the double-sided tape 35a effectively functions if, without using the double-sided tape 35a, a strong bright portion is generated near the lateral surface 14a in a region close from the LED 16. When the bright portion is strongly generated on the lateral surface 14a in a region far from the LED 16, the density of the slits 32 may be increased as it goes away from the LED 16.

(Fourth Embodiment)

Figure 8:
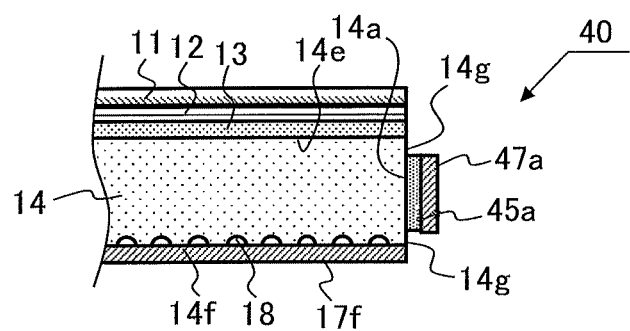
FIG. 8 is a partial cross-sectional view of a backlight 40.
Figure 9:
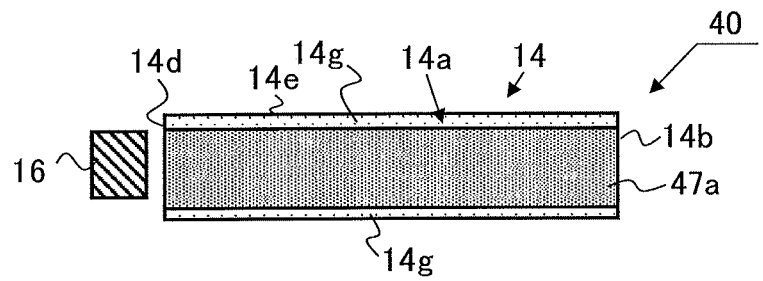
FIG. 9 is a side view of the backlight 40.
Figure 10:
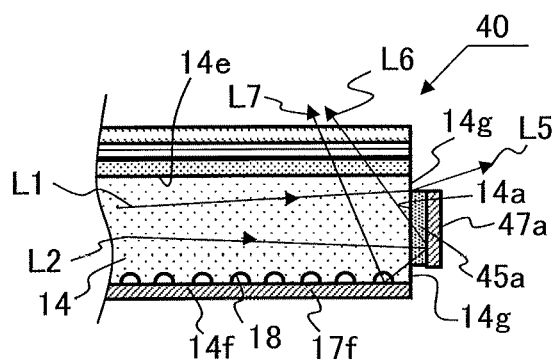
FIG. 10 is a partial cross-sectional view of the backlight 40.

With reference to FIG. 8 to FIG. 10, explanation will be given for a backlight 40 illustrated as a fourth embodiment of the present invention. FIG. 8 is a partial cross-sectional view of the backlight 40 which is the same as FIG. 2. FIG. 9 is a side view of the backlight 40 drawn for explaining the relationship between the lateral surface 14a of the light guide plate 14 and the lateral surface reflection sheet 47a. FIG. 10 is a partial cross-sectional view of the backlight 40 drawn for explaining a mechanism for eliminating the bright portion near the lateral surface. The backlight 40 is the same as the backlight 10 except for the shapes of the double-sided tape 45a and the lateral surface reflection sheet 47a. In the following explanation, the description of the backlight 40 is omitted as appropriate for portions same as the portions of the backlight 10.

With reference to FIG. 8, explanation will be given for members of the backlight 40. A double-sided tape 45a is attached to a center of the lateral surface 14a of the light guide plate 14. Further, the lateral surface reflection sheet 47a is attached thereto through the double-sided tape 45a. The width of the lateral surface reflection sheet 47a is narrower than the width of the lateral surface 14a, and therefore there are portions (referred to as exposed units 14g hereafter) exposed from the lateral surface reflection sheet 47a on upper and lower sides of the lateral surface 14a.

As illustrated in FIG. 9, the width of the lateral surface reflection sheet 47a in a vertical direction (thickness direction of the light guide plate 14) in the drawing is constant (in the form of a band), for example 1.1 mm, and is smaller than the thickness of the light guide plate 14 (2.25 mm as described above). So as not to lower the luminous efficiency, the length of the lateral surface reflection sheet 47a in the thickness direction of the light guide plate 14 is preferably 50% or more of the thickness of the light guide plate 14, and more preferably 75% or more of the thickness of the light guide plate 14. The lateral surface reflection sheet 47a is attached to a center of the lateral surface 14a in the thickness direction. As a result, the exposed units 14g are observed on upper and lower sides of the lateral surface reflection sheet 47a. The widths of the lateral surface reflection sheet 47a and the double-sided tape 45a are, for example, about 1.8 mm. The position where the lateral surface reflection sheet 47a is attached with respect to the lateral surface 14a in a short direction may be any of an upper position, a center position, and a lower position. The width of the lateral surface reflection sheet 47a is adjusted according to a state of the bright portion generated on the light emission surface 14e. In FIG. 9, the purpose is to explain the relationship between the lateral surface 14a and the lateral surface reflection sheet 47a, and therefore the reflective surface reflection sheet 17f, the lateral surface reflection sheet 17b, the diffusion sheet 13, the prism sheet 12, the polarization sheet 11, and the double-sided tape 45b are not illustrated.

As illustrated in FIG. 10, in the backlight 40, similarly to the backlight 100, due to the diffusive reflection of the light beam L2 by the diffusion reflective surface of the lateral surface reflection sheet 47a, light beams L6 and L7 are generated. In contrast, the light beam L1 passes through the lateral surface 14a while refracting and is emitted to the outside of the light guide plate 14 as the light beam L5. In other words, after emitting from the light guide plate 14, the light beam L5 does not return to the light guide plate 14 again, resulting in generating the light beam L5 in the backlight 40. Therefore, the diffusely reflected light is reduced and the bright portion is not generated near the lateral surface 14a as compared with the backlight 100 illustrated in FIG. 4. This mechanism applies to other lateral surfaces 14b and 14c. The light beam L1 has a component that is reflected by the lateral surface 14a, but this is not illustrated.

As described above, the widths of the lateral surface reflection sheets 47a, 47b, 47c are set to be smaller than the thickness of the light guide plate 14 on the lateral surfaces 14a, 14b, 14c other than the incident surface 14d of the light guide plate 14 of the backlight 40 and the light is emitted from the exposed unit 14g etc., to thereby adjust the emission quantities on the light emission surface 14e near the lateral surface. As a result, in the backlight 40, the bright portion is not generated near the lateral surfaces 14a, 14b 14c of the light guide plate 14, even when the lateral surface reflection sheets 47a, 47b, 47c which are plate-like lateral surface reflection sheets are brought close to the lateral surfaces 14a, 14b, 14c of the light guide plate 14.

(Fifth Embodiment)

In the backlight 40 of the fourth embodiment, the lateral surface reflection sheet 47a is in the form of a band, and therefore the ratio between the emission quantities of the light diffusely reflected and the emission quantities of the light emitted to the outside from the exposed unit 14g is equal anywhere in the longitudinal direction of the lateral surface 14a of the backlight 40. However, depending on a position in the longitudinal direction of the lateral surface 14a, it is desired in some cases to change the ratio between the emission quantities of the light diffusely reflected and the emission quantities of the light emitted to the outside. Therefore, with reference to FIG. 11, explanation will be given for a backlight 50 as a fifth embodiment in which the proportion of the emission quantities of the light emitted to the outside is large on the lateral surface 14a in a region far from the LED 16, and the proportion of the emission quantities of the light diffusely reflected is large on the lateral surface 14a in a region close to the LED 16.

Figure 11:
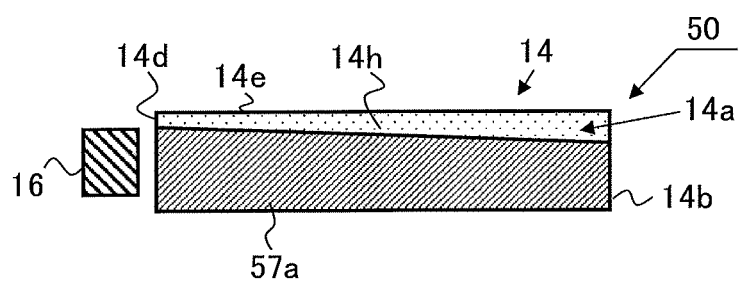
FIG. 11 is a side view of a backlight 50.

FIG. 11 is a side view of the backlight 50 drawn for explaining the relationship between the lateral surface 14a of the light guide plate 14 and the lateral surface reflection sheet 57a. When FIG. 11 and FIG. 9 are compared, FIG. 11 differs from FIG. 9 only in the shape of the lateral surface reflection sheet 57a. The lateral surface reflection sheet 57a is formed such that the surface facing the lateral surface 14a is a diffusion reflective surface. Note that members which are omitted to be illustrated are the same as those of FIG. 9.

The width of the lateral surface reflection sheet 57a on the lateral surface 14a is wide in a region close to the LED 16, and narrows as it goes away from the LED 16. On the contrary, the width of the exposed unit 14h is narrow in a region close to the LED 16, and widens as it goes away from the LED 16. In other words, if, without using the lateral surface reflection sheet 57a, the bright portion is strongly generated near the lateral surface 14a in a region far from the LED 16, the lateral surface reflection sheet 57a effectively functions to eliminate the bright portion. On the contrary, when the bright portion is strongly generated near the lateral surface 14a in a region close to the LED 16, the width of the lateral surface reflection sheet 57a may be widened as it goes away from the LED 16. Further, an upper side of the lateral surface reflection sheet 57a is a straight line that slopes down to the right, but may be a curve as needed. A situation of the bright portion is strongly influenced by an arrangement position of the LED 16 and the dots 18 etc. (see FIG. 8) formed on the reflection surface 14f, and therefore it is preferable to adjust the shape of the lateral surface reflection sheet 57a to eliminate the bright portion when the lateral surface reflection sheet 57a is attached as a final stage of a manufacturing process.

(Sixth Embodiment)

In the backlight 40 illustrated as the fourth embodiment, the reflective surface reflection sheet 17f facing the reflective surface 14f of the light guide plate 14, and the lateral surface reflection sheets 47a to 47c are separate bodies. However, the reflection sheets may be formed by extending side portions of the reflective surface reflection sheet and folding the extended side portions. Therefore, with reference to FIG. 12 and FIG. 13, in the sixth embodiment, explanation will be given for a backlight 60 capable of suppressing a dark portion near the lateral surface, even when the reflective surface reflection sheet and the lateral surface reflection sheet are integrally formed.

Figure 12:
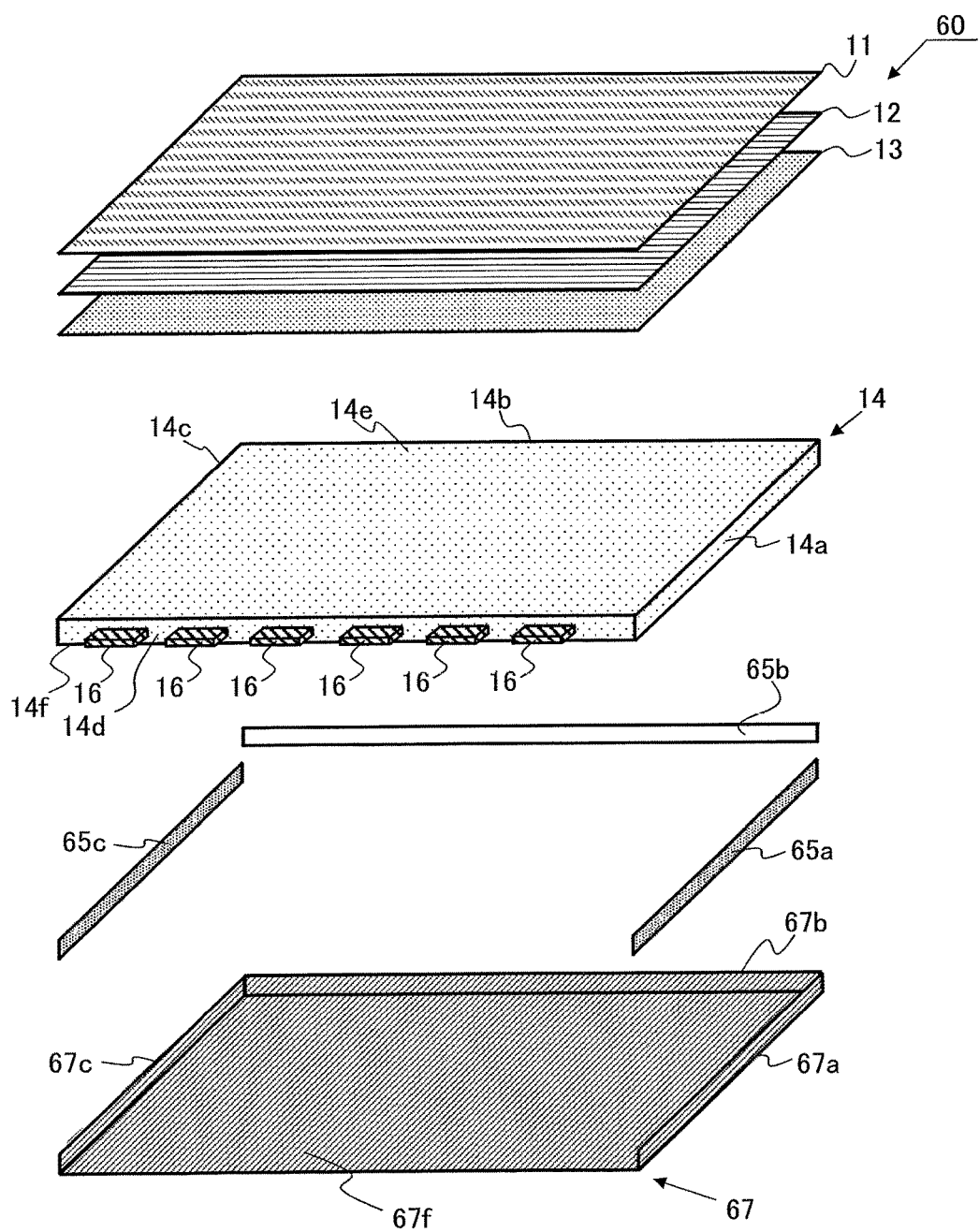
FIG. 12 is an exploded perspective view of a backlight 60.

FIG. 12 is an exploded perspective view of the backlight 60. In the reflection sheet 67, the lateral surface reflection sheets 67a, 67b, 67c and the reflective surface reflection sheet 67f are integrally formed, and an upper surface of the reflective surface reflection sheet 67f and inner side surfaces of the lateral surface reflection sheets 67a, 67b, 67c are formed as diffusion reflective surfaces. In the reflection sheet 67, rectangular portions are extended from three sides of the reflective surface reflection sheet 67f, and the extended portions are lateral surface reflection sheets 67a to 67c. FIG. 12 illustrates a state in which the lateral surface reflection sheets 67a to 67c are folded with respect to the reflective surface reflection sheet 67f. Each of the lateral surface reflection sheets 67a, 67b, 67c is adhered to the lateral surfaces 14a, 14b, 14c through the double-sided tapes 65a, 65b, 65c, respectively.

Figure 13:
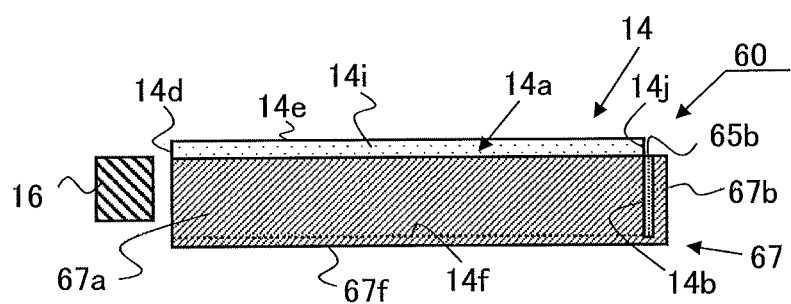
FIG. 13 is a side view of the backlight 60.

FIG. 13 is a side view of the backlight 60 observed from the lateral surface 14a side. A reflective surface reflection sheet 67f is disposed on a lower side of the reflective surface 14f (see FIG. 12) of the light guide plate 14. The lateral surface 14a is covered with the lateral surface reflection sheet 67a, and an exposed unit 14i of the lateral surface 14a is observed on an upper side of the lateral surface reflection sheet 67a. Likewise, the lateral surface 14b is covered with the lateral surface reflection sheet 67b, and an exposed unit 14j is present on the upper side of the lateral surface reflection sheet 67a. In this structure, the double-sided tape 65b sandwiched between the lateral surface 14b and the lateral surface reflection sheet 67b is observed. From FIG. 13, it is also found that the reflective surface reflection sheet 67f and the lateral surface reflection sheets 67a, 67b are integrally formed.

The lateral surface reflection sheet 67c (not illustrated in FIG. 13) is also integrally formed with the reflective surface reflection sheet 67f in the same form (see FIG. 12). When the reflection sheet 67 is folded to form the reflective surface reflection sheet 67f and the lateral surface reflection sheets 67a to 67c, the number of constituent members can be reduced.

In the backlight 10, a transparent double-sided tape 15a is attached to a part of the lateral surface. Then, the bright portion generated near the lateral surface is eliminated by causing the specular reflection to be generated in a region to which the double-sided tape 15a etc., is not attached, and reducing the diffusive reflection. However, when a transparent double-sided tape is used, the bright portion may not be completely eliminated in some cases. Therefore, a reflective double-sided tape may be used instead of the double-sided tape. The reflective double-sided tape is preferably a specular reflection type or a retroreflective type in which a direction of incidence of light beams coincides with a direction of reflection of light beams. Since the reflective double-sided tape hardly causes diffusive reflection, it becomes possible to drastically reduce the diffusively reflected light without lowering a light utilization efficiency.

The preceding description has been presented only to illustrate and describe exemplary embodiments of the present backlight. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but the invention will include all embodiments falling within the scope of the claims. The invention may be practiced otherwise than is specifically explained and illustrated without departing from its spirit or scope.

What is claimed is:

1. A backlight, comprising:
   a light guide plate including a light emission surface, a reflective surface and at least one of lateral surface as an incident surface;
   a light source disposed to face the incident surface;
   a reflective member which is disposed to face another lateral surface other than the incident surface and includes a diffusion reflective surface; and
   an adhesive member for adhering the reflective member to the another lateral surface of the light guide plate,
   wherein a length of the adhesive member in a thickness direction of the light guide plate is smaller than a thickness of the light guide plate, and
   the length of the adhesive member in the thickness direction of the light guide plate is not constant.

2. The backlight according to claim 1, wherein the adhesive member includes a slit.

3. The backlight according to claim 1, wherein a length of the reflective member in the thickness direction of the light guide plate is smaller than a thickness of the light guide plate.

4. The backlight according to claim 1, wherein a length of the reflective member in the thickness direction of the light guide plate is constant.

5. A backlight, comprising:
   a light guide plate including a light emission surface, a reflective surface and at least one of lateral surface as an incident surface;
   a light source disposed to face the incident surface;
   a reflective member which is disposed to face another lateral surface other than the incident surface and includes a diffusion reflective surface; and an adhesive member for adhering the reflective member to the another lateral surface of the light guide plate, wherein a length of the adhesive member in a thickness direction of the light guide plate is smaller than a thickness of the light guide plate, and a length of the reflective member in the thickness direction of the light guide plate is not constant.

6. A backlight, comprising:

a light guide plate including a light emission surface, a reflective surface and at least one of lateral surface as an incident surface;

a light source disposed to face the incident surface;

a reflective member which is disposed to face another lateral surface other than the incident surface and includes a diffusion reflective surface; and an adhesive member for adhering the reflective member to the another lateral surface of the light guide plate, wherein a length of the adhesive member in a thickness direction of the light guide plate is smaller than a thickness of the light guide plate, and the another lateral surface of the light guide plate includes exposed units on the reflective surface side.

7. The backlight according to claim 1, wherein the reflective member further includes a portion which is integrally formed with a portion disposed to face the another lateral surface of the light guide plate, and which is disposed to face the reflective surface of the light guide plate.

8. The backlight according to claim 1, wherein at least one of the lateral surfaces is a specular reflective surface.

9. The backlight according to claim 5, wherein the length of the adhesive member in the thickness direction of the light guide plate is constant.

10. The backlight according to claim 6, wherein the length of the adhesive member in the thickness direction of the light guide plate is constant.

11. The backlight according to claim 5, wherein the adhesive member includes a slit.

12. The backlight according to claim 6, wherein the adhesive member includes a slit.

13. The backlight according to claim 5, wherein a length of the reflective member in the thickness direction of the light guide plate is smaller than a thickness of the light guide plate.

14. The backlight according to claim 6, wherein a length of the reflective member in the thickness direction of the light guide plate is smaller than a thickness of the light guide plate.

15. The backlight according to claim 5, wherein a length of the reflective member in the thickness direction of the light guide plate is constant.

16. The backlight according to claim 6, wherein a length of the reflective member in the thickness direction of the light guide plate is constant.

17. The backlight according to claim 5, wherein the reflective member further includes a portion which is integrally formed with a portion disposed to face the another lateral surface of the light guide plate, and which is disposed to face the reflective surface of the light guide plate.

18. The backlight according to claim 6, wherein the reflective member further includes a portion which is integrally formed with a portion disposed to face the another lateral surface of the light guide plate, and which is disposed to face the reflective surface of the light guide plate.

19. The backlight according to claim 5, wherein at least one of the lateral surfaces is a specular reflective surface.

20. The backlight according to claim 6, wherein at least one of the lateral surfaces is a specular reflective surface.

* * * * *